United States Patent [19]
Okada

[11] Patent Number: 4,765,635
[45] Date of Patent: Aug. 23, 1988

[54] FUEL TANK MOUNTING DEVICE

[75] Inventor: Hidehiko Okada, Zama, Japan

[73] Assignee: Nissan Motor Co., Ltd., Yokohama, Japan

[21] Appl. No.: 74,857

[22] Filed: Jul. 17, 1987

[30] Foreign Application Priority Data

Jul. 21, 1986 [JP] Japan .......................... 61-112522[U]

[51] Int. Cl.⁴ .............................................. B60K 15/08
[52] U.S. Cl. .................................... 280/5 A; 137/354; 220/69
[58] Field of Search ............... 280/5 A, 5 R; 248/300, 248/311.2; 180/68.4, 68.6, 69.4, 314; 220/5 A, 69, 70; 137/354, 351; 296/204

[56] References Cited

U.S. PATENT DOCUMENTS

| | | | |
|---|---|---|---|
| 2,109,316 | 2/1938 | Harley | 280/5 A |
| 4,369,981 | 1/1983 | Chiba et al. | 280/5 A |
| 4,416,461 | 11/1983 | Hayashi et al. | 280/5 A |

FOREIGN PATENT DOCUMENTS

| | | | |
|---|---|---|---|
| 58-141922 | 8/1983 | Japan | 280/5 A |
| 61-196823 | 9/1986 | Japan | 280/5 A |
| 61-249824 | 11/1986 | Japan | 280/5 A |

Primary Examiner—John J. Love
Assistant Examiner—Charles R. Watts
Attorney, Agent, or Firm—Foley & Lardner, Schwartz, Jeffery, Schwaab, Mack, Blumenthal & Evans

[57] ABSTRACT

A supporting band partly encircles a fuel tank and supports same upon a rear floor. The supporting band has a front end secured to the front end portion of the rear floor and a rear end secured to the rear end portion of the rear floor by means of a bolt screwed into a nut which is welded to a horizontal plate section of a nut plate. The rear end portion of the rear floor is formed with a downward flange secured to the inner face of a rear panel. The flange of the rear floor is formed with a projection which defines a hole between the flange and the rear panel. The nut plate is spot-welded at the horizontal plate section to the upper face of the rear floor and has a vertical plate section inserted into the hole and spot-welded to the flange and the rear panel.

3 Claims, 3 Drawing Sheets

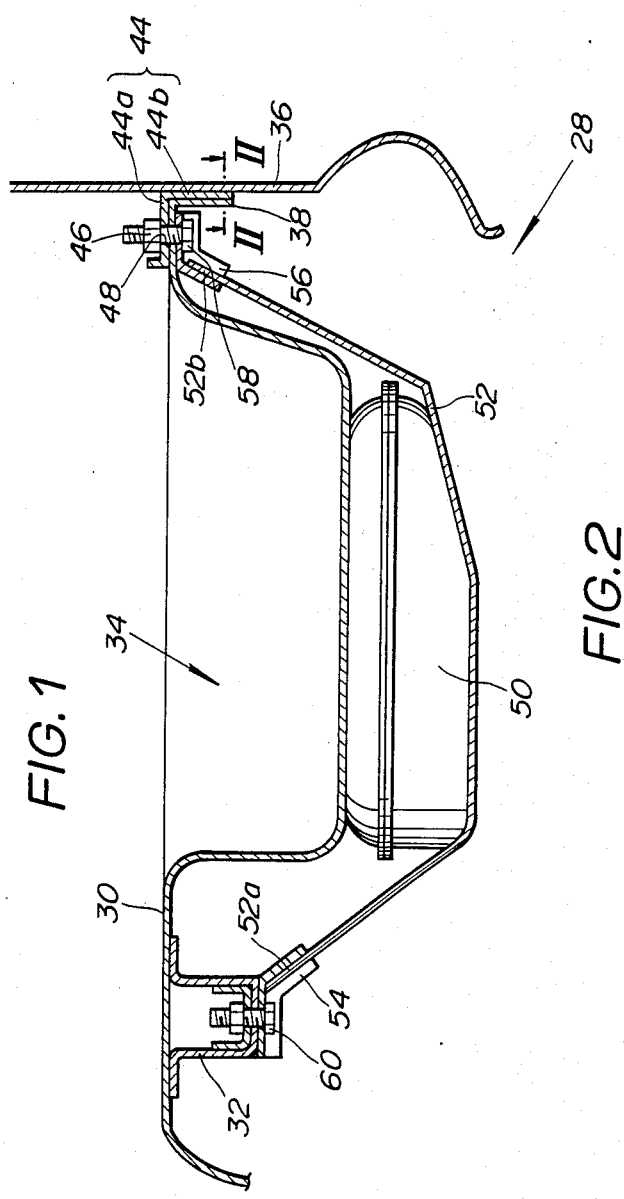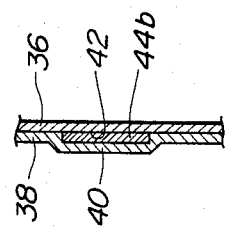

FUEL TANK MOUNTING DEVICE

BACKGROUND OF THE INVENTION

1. Field of the Invention

The present invention relates in general to fuel tanks for automotive vehicles and more particularly to a device for mounting a fuel tank on a rear floor of a vehicle body.

2. Description of the Prior Art

In a prior art automotive vehicle, as exemplarily shown in FIGS. 4 and 5, a fuel tank 10 is disposed under a rear floor 12 and adapted to be supported on a cross member 14, which is arranged at the front end portion of the rear floor 12, and on the rear end portion of the rear floor 12 by means of a supporting band 16 made of steel. A mounting bracket 18 is welded to the rear end of the supporting band 16, and a nut plate 20, which is of an L-like cross section and includes a horizontal plate section 20a and a vertical plate section 20b, is welded at the horizontal plate section 20a, to the rear end portion of the rear floor 12 and at the vertical plate section 20b to a rear panel 22. A nut 24 is welded to the horizontal plate section 20a. The rear end of the supporting band 16 is attached to the rear end portion of the rear floor panel 12 by screwing a fastening bolt 26, which is inserted into bolt accomodation holes formed in the mounting plate 18, rear floor panel 12 and the nut plate 20, into the nut 24.

In the above structure, a large load resulting from an inertia of the fuel tank 10 upon a sudden stop or head-on collision of the vehicle is transferred through the supporting band 16 to act in concentrative manner upon the portion of the cross member 14 and the portion of the rear floor 12 to which the opposite ends of the supporting band 16 are attached. In this instance, the load acting upon the nut plate 20 is directed so as to pull the horizontal plate section 20a and the vertical plate section 20b in the opposite directions and urge them to lie straight. The vertical plate section 20b is therefore subjected to a force that urges the vertical plate section 20b to be stripped off from the panel 22.

However, since the vertical plate section 20b is spot-welded to the rear panel 22 only in the several places, there has been a possibility that the nut plate 20 is stripped off from the rear panel 22 when subjected to a large load resulting from an inertia of the fuel tank upon a sudden stop or head-on collision of a vehicle, resulting in a reduced rigidity and therefore a reduced reliability in support of the fuel tank 20.

SUMMARY OF THE INVENTION

In accordance with the present invention, there is provided a fuel tank mounting device which comprises a particular nut plate and a particular rear end portion of a rear floor. The rear end portion of the rear floor is formed with a downward flange secured to the inner face of a rear panel. The nut plate has a horizontal plate section installing a nut and secured to the rear floor, and a vertical plate section interposed between the flange and the rear panel and secured to the both.

In one specific embodiment, the flange is formed with a projection which defines a hole between the flange and the rear panel. The vertical plate section of the nut plate is fittingly received in the hole.

The above structure is quite effective for overcoming the above noted disadvantages and shortcomings inherent in the prior art device.

It is accordingly an object of the present invention to provide a novel and improved fuel tank mounting device for an automotive vehicle which can effect an assured and reliable support of a fuel tank.

It is a further object of the present invention to provide a novel and improved fuel tank mounting device of the above described character which can assuredly prevent substantial deformation of a rear end portion of a rear floor, to which rear end portion an end of a supporting band for supporting a fuel tank is attached.

It is a still further object of the present invention to provide a novel and improved fuel tank mounting device of the above described character which can assuredly prevent a vertical plate section of a nut plate from being stripped off from a rear panel even when the nut plate is subjected to a large load resulting from an inertia of the fuel tank upon a sudden stop or head-on collision of the vehicle.

BRIEF DESCRIPTION OF THE DRAWINGS

FIG. 1 is a sectional view of a fuel tank mounting device according to an embodiment of the present invention;

FIG. 2 is a sectional view taken along the line II—II of FIG. 1;

DETAILED DESCRIPTION OF THE PREFERRED EMBODIMENT

Figure 3:
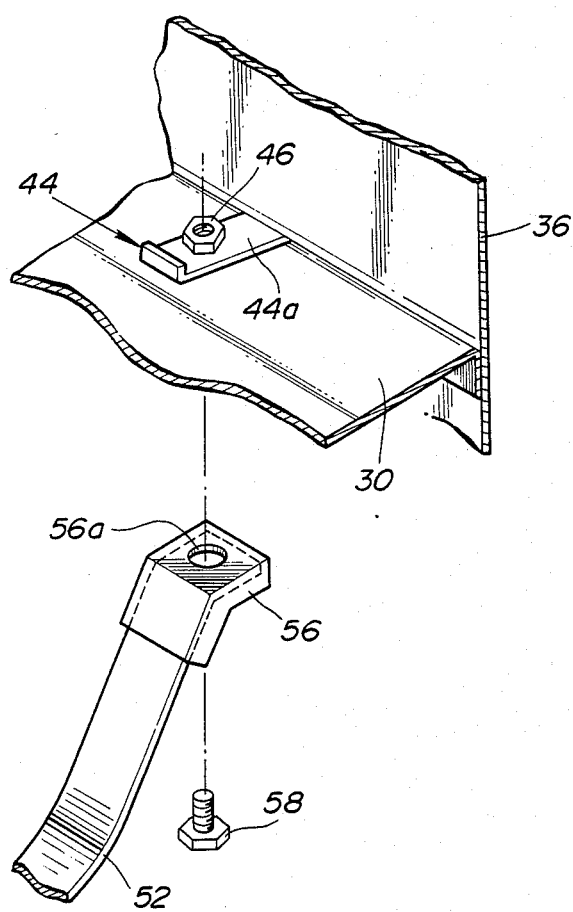
FIG. 3 is a fragmentary exploded view of the fuel tank mounting device of FIG. 1.
Figure 4:
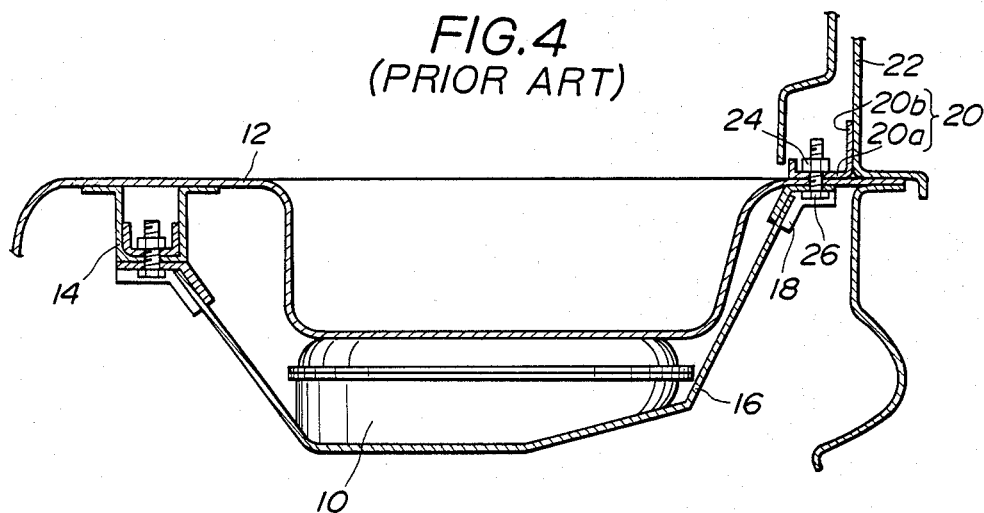
FIG. 4 is a sectional view of a prior art fuel tank mounting device.
Figure 5:
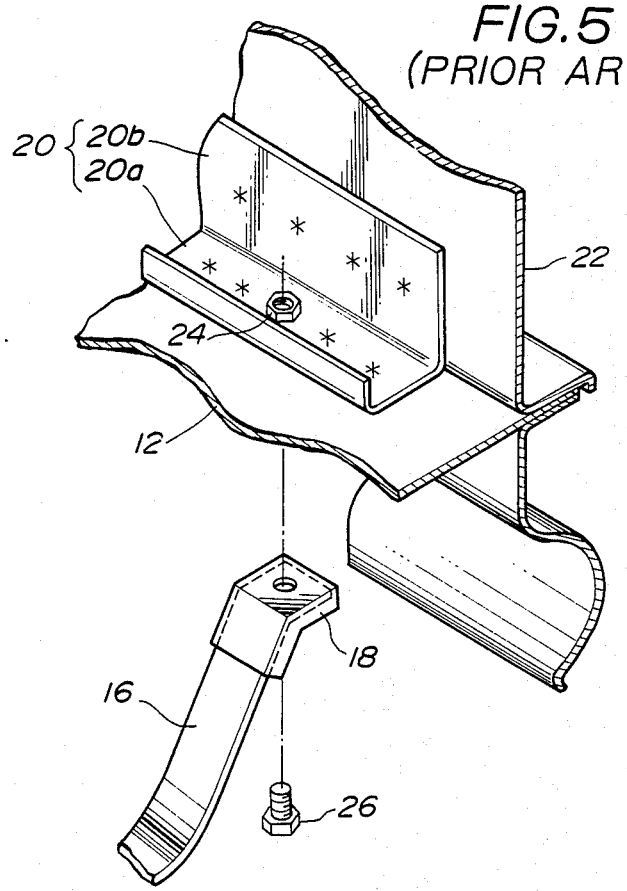
FIG. 5 is a fragmentary exploded view of the prior art fuel tank mounting device of FIG. 4.

Referring to FIGS. 1 through 3, a fuel tank mounting device of this invention is generally indicated by the reference numeral 28 and shown as including a generally horizontal rear floor 30, a cross member 32 disposed under the front end of the rear floor 30 and welded thereto, a tire housing 34 formed in the rear floor 30 for receiving therein a spare tire, and a generally vertical rear panel 36 disposed at the rear end of the rear floor 30.

The rear floor 30 is formed at the rear end with a downward flange 38 extending vertically along the rear panel 36. The flange 38 extends between unshown side members and is welded to the rear panel 36. The flange 38 is also formed with a vertical projection 40 extending vertically throughout thereof and projecting forwardly of the vehicle body to define a plate receiving hole 42 between the flange 38 and the rear panel 36.

Indicated by the reference numeral 44 is a nut plate which is of an L-like cross section and consists of a horizontal plate section 44a and a vertical plate section 44b depending from the rear end of the horizontal plate section 44a. The horizontal plate section 44a is placed on the rear end portion of the rear floor 30 on the upper side therof and spot-welded thereto. The vertical plate section 44b is fittingly received in the hole 42 and spot-welded to the flange 38 and the rear panel 36. A nut 46 is welded to the horizontal plate section 44b, and a bolt accomodation hole 48 aligned with the nut 46 is formed in the horizontal plate section 44a and the rear floor 30 to extend therethrough.

A fuel tank 50 is disposed under the rear floor 30 and is supported thereon by a supporting band 52 made of steel and partly encircling the fuel tank 50. In this embodiment, the fuel tank 50 is so installed as to be pressed against the tire housing 34 of the rear floor 30 and held stationary relative threto. To this end, the supporting band 52 has front and rear ends 52a, 52b to which mounting brackets 54, 56 are welded respectively. The mounting bracket 54 attached to the front end 52a of the supporting band 52 is secured to the cross member 32 by means of a bolt 60, whilst the mounting bracket 56, which is formed with a bolt accomodation hole 56a aligned with the bolt accomodation hole 48, is secured to the nut plate 44 by means of a bolt 58 which is inserted into the bolt accomodation holes 48, 56a and screwed into the nut 46.

With the foregoing structure, a large load resulting from an inertia of the fuel tank 50 to act upon the nut plate 44 is distributed through the transversal thick-walled structure constituted by the flange 38 and the rear panel 36 to the aforementioned side members. As a result, the rear end portion of the rear floor 30 around the nut plate 44 is subjected to only a relatively small load.

Further, since the vertical plate section 44b of the nut plate 44 is interposed between the flange 38 of the rear floor 30 and the rear panel 36 and secured thereto, the vertical plate section 44b is assuredly prevented from being stripped off from the rear panel 36 even when the vertical plate section is subjected to a large load directed forwardly of the vehicle body.

From the foregoing, it will be appreciated that a large load resulting from an inertia of the fuel tank upon a sudden stop or head-on collision of the vehicle can be effectively distributed to the side members of the vehicle body through the aforementioned thick-walled strucutre.

It will be further appreciated that substantial deformation of the rear end portion of the rear floor can be assuredly prevented and therefore assured and reliable support of the fuel tank can be attained, while making it possible for the nut plate to be small-sized to attain the reduction in weight.

It will be further appreciated that the vertical plate section of the nut plate is assuredly prevented from being stripped off from the rear panel even when the nut plate is subjected to a large load resulting from an inertia of the fuel tank upon a sudden stop or head-on collision of the vehicle since the vertical plate section of the nut plate is interposed between the rear flange of the rear floor and the rear panel and secured thereto with a high rigidity.

What is claimed is:

1. A fuel tank mounting device comprising:
   a rear panel having an inner face;
   a rear floor having front and rear end portions and secured at the rear end portion to said rear panel;
   a nut plate of an L-like cross section, having a horizontal plate section secured to the rear end portion of said rear floor and a vertical plate section secured to the inner face of said rear panel;
   said horizontal plate section having secured thereto a nut;
   a fuel tank disposed under said rear panel; and
   a supporting band partly encircling said fuel tank and supporting same upon said rear floor;
   said supporting band having a front end secured to the front end portion of said rear floor and a rear end secured to the rear end portion of said rear floor by means of a bolt screwed into said nut;
   said rear end portion of said rear floor having a downward flange secured to the inner face of said rear panel;
   said vertical plate section being interposed between said flange of said rear floor and said rear panel and secured further to said flange.

2. A fuel tank mounting device as set forth in claim 1 wherein said flange of said rear floor is formed with a projection extending vertically thereof and projecting forwardly to define a hole in which said vertical plate section of said nut plate is fittingly received.

3. A fuel tank mounting device comprising:
   a generally vertical rear panel having an inner face;
   a generally horizontal rear floor having front and rear end portions and secured at the rear end portion to said rear panel;
   a cross member disposed under said front end portion of said rear floor and secured thereto;
   a nut plate of an L-like cross section, having a horizontal plate section and a vertical plate section;
   said rear end portion of said rear floor having an upper face on which said horizontal plate section is placed and spot-welded to same;
   said horizontal plate section having secured thereto a nut;
   said horizontal plate section and said rear end portion of said rear floor being formed with a bolt accomodation hole extending therethrough and aligned with said nut;
   a fuel tank disposed under said rear floor; and
   a supporting band partly encircling said fuel tank and supporting same upon said rear floor;
   said supporting band having front and rear ends to which front and rear mounting brackets are secured respectively;
   said front mounting bracket being bolted to said cross member;
   said rear mounting bracket being formed with a bolt accomodation hole aligned with said first mentioned bolt accomodation hole and said nut and secured to the rear end portion of said rear floor by means of a bolt which is inserted into said bolt accomodation holes and screwed into said nut;
   said rear end portion of said rear floor having at a rear termination thereof a downward flange secured to the inner face of said rear panel;
   said flange being formed with a projection extending vertically thereof and projecting forwardly to define a hole between said flange and said rear panel;
   said vertical plate section being received in said hole and spot-welded to said flange and said rear panel.

* * * * *